United States Patent [19]

Hilterhaus et al.

[11] 4,108,807

[45] Aug. 22, 1978

[54] ORGANO-METALLATE POLYMERS AND PROCESSES FOR THE MANUFACTURE THEREOF

[75] Inventors: Karl Heinz Hilterhaus, Georgsmarienhütte; Franz Gottfried Reuter, Lemförde, both of Fed. Rep. of Germany

[73] Assignees: Chemic-Anlagenbau Bischofsheim GmbH, Osnabruck; Reuter Technologie GmbH, Lemforde; Metallgesellschaft Aktiengesellschaft, Frankfurt am Main, all of Fed. Rep. of Germany

[21] Appl. No.: 706,199

[22] Filed: Jul. 19, 1976

[30] Foreign Application Priority Data

Jul. 18, 1975 [GB] United Kingdom ............... 30303/75

[51] Int. Cl.² ....................... C08G 18/18; C08G 18/38
[52] U.S. Cl. .................................... 521/118; 521/153; 521/162
[58] Field of Search .................... 260/2.5 AB, 2.5 AK, 260/2.5 AM, 2.5 AE, 2.5 A, 2.5 AC, 2.5 AW, 77.5 NC, 77.5 R, 77.5 AC

[56] References Cited

U.S. PATENT DOCUMENTS

| | | | |
|---|---|---|---|
| 2,916,464 | 12/1959 | Ebneth | 260/2.5 AB |
| 3,359,218 | 12/1967 | Wiles | 260/2.5 AM |
| 3,471,411 | 10/1969 | Bowman | 260/2.5 AB |
| 3,607,794 | 9/1971 | Abbotson | 260/2.5 AK |
| 3,718,612 | 2/1973 | Strickman | 260/2.5 BD |
| 3,736,298 | 5/1973 | Schmit | 260/2.5 AK |
| 3,751,392 | 8/1973 | Olstowski | 260/2.5 AB |
| 3,808,162 | 4/1974 | Allen | 260/18 TN |
| 3,899,520 | 8/1975 | Van Leuwen | 260/2.5 AB |
| 3,975,316 | 8/1976 | Villa | 260/2.5 AK |
| 3,983,081 | 9/1976 | Dieterich | 260/2.5 AK |
| 4,042,536 | 8/1977 | Dieterich | 260/2.5 AM |
| 4,057,519 | 11/1977 | Summers | 260/2.5 AK |

*Primary Examiner*—C. Warren Ivy
*Attorney, Agent, or Firm*—Larson, Taylor and Hinds

[57] ABSTRACT

This invention relates to a process for the manufacture of an organo-metallate polymere which comprises reacting in a liquid phase a metallate with a pseudohalide compound and/or other polymerizable compound and allowing the reaction to proceed to completion.

18 Claims, No Drawings

ORGANO-METALLATE POLYMERS AND PROCESSES FOR THE MANUFACTURE THEREOF

This invention relates to organo-metallate polymers and to processes for the manufacture thereof.

It has surprisingly been found that when a metallate solution is mixed, preferably homogeneously, with a pseudohalide compound and/or one or more other polymerizable compounds and the reaction is allowed to proceed to completion, new products with outstanding properties are obtained. By means of the process according to the invention, organo-metallate polymers in the form of non-porous or foamed compositions may be produced.

As the solvent of the metallate solution there may be used for example water, a mixture of one or more organic solvents or a mixture of water and one or more organic solvents. A solubilizer may optionally be added to the solution to enable the metallate concentration to be increased. Examples of suitable solubilizers for increasing the metallate solubility are, in particular, those compounds that are capable of forming complexes with the metallates. These compounds may be of an inorganic or organic nature.

Bye the term "metallates" there is meant soluble salts of ortho, meta and/or polymetallic acids or ortho, meta and/or polymetallic thioacids of the general formula $$H_n [MeX_m]$$

in which Me is a metal which is capable of forming an anion with X with denotes oxygen and/or sulphur. As suitable metallates there may be mentioned, for example, germanates, stannates, thiostannates, plumbates, aluminates, titanates, vanadates, chromates, manganates, molybdates, tungstates, arsenates, tellurates, bismuthates, zincates, niobates, tantalates and mixtures thereof, in which the cation may be, for example, potassium, sodium, $NH_4^+$ or calcium.

Preferably there are used one or more metallates which are sufficiently soluble in water to yield aqueous solutions of high concentration. Apart from using aqueous solutions of water-soluble metallates, however, there may be used organic solutions of metallates which can be dissolved in organic monomers and/or polymers. Preferred metallates are those, an aqueous solution of which has a pH value in the basic range. As specific examples of metallates which can be used in the process of the invention there may be mentioned potassium chromate ($K_2CrO_4$), sodium hydrogen arsenate ($Na_2H As O_4 . 7 H_2O$), sodium tungstate ($Na_2W O_4 . 2 H_2O$), sodium molybdate ($Na_2Mo O_4 . 2 H_2O$), sodium stannate ($Na_2SnO_3 . 3 H_2O$), potassium tellurite ($K_2TeO_3$), potassium aluminate ($KAlO_2$) and alkaline titanium dioxide solutions ($Me_2TiO_3 . n H_2O$).

Supersaturated aqueous metallate solutions, to which metal ions and/or complexes thereof have optionally been added for stabilization, are preferably used.

As well as "pure" metallate solutions it is possible to use solutions of metallates which have not been purified previously (crude metallates). The industrial metallate solutions, for example, often contain impurities in the dissolved and/or dispersed form.

As the complex-forming compounds which may be added to the metallate solutions there may be mentioned, for example, those that are capable of forming five and six-membered ring complexes. Five-membered rings are formed, for example, when there are two adjacent OH-groups in the complex-forming compound as is the case, for example, in glycols, triols and the sugar alcohols. Further examples of such complex-forming compounds are those that form the oxalato, glycino or ethylene diamine tetraacetic acid complexes.

Six-membered rings are produced when the complex-forming substance contains a double bond. Among these are, for example, the acetylacetonato and salicylato complexes.

Furthermore, it is possible to form complexes having quadridentate ligands and which have either five or six-membered rings. An example is the bis-(acetylacetone) ethylene diimine complex.

Complex-forming compounds which are externally electrically neutral because they are non-ionic are preferred.

Of the organic complex-forming compounds there are preferred polyols which contain at least two hydroxyl groups on adjacent carbon atoms or in which at most one additional carbon atom is disposed between the carbon atoms carrying hydroxyl groups. Suitable compounds of this kind are, for example, ethylene glycol, glycerin mannitol, 1,2-dihydroxypropane, phenylglycol, pyrocatechol, monoethers of glycerin, 2,3-napthalene diol, 1,8-naphthalene diol and 2-chloro-4-(1,1,3,3-tetramethyl-butyl)-6-hydroxymethylphenol.

The complex-forming compounds are preferably used in approximately stoichiometric quantities calculated on the metallate.

As the pseudohalo compounds there are used those substances which are capable of cross-linking and/or lengthening chains, for example, isocyanates and/or thioisocyanates with at least two isocyanate or thioisocyanate groups, thiocyanates, selenocyanates and tellurocyanates.

There are preferably used mixtures of isocyanate compounds which contain a predominant quantity of polyisocyanate compounds having at least three isocyanate groups. Examples of these are the isocyanates commercially available under the name "Desmodur 44 V" and "PAPI."

Polyisocyanate mixtures which contain substantially no diisocyanates and monoisocyanates are preferred. They may be obtained, for example, according to the process described in German Offenlegungsschrift No. 2,105,193. In that process, an organic polyisocyanate mixture obtained by phosgenising crude aniline formaldehyde resins containing a predominant quantity of diphenyl-methane diisocyanate isomers and higher functional polyisocyanates with more than two benzene rings in the molecule, is separated into the diphenyl methane diisocyanate isomers and the higher functional polyisocyanates.

Suitable organic diisocyanates are, for example, aliphatic diisocyanates, aromatic diisocyanates, acyclic diisocyanates and heterocyclic diisocyanates, for example methylene diisocyanate, ethylene diisocyanate, propylene diisocyanate, butylene diisocyanate, cyclehexylene-1,4-diisocyanate, cyclohexylene-1,2-diisocyanate, tetra or hexamethylene diisocyanate, arylene diisocyanates or the alkylation products thereof, such as the phenylene diisocyanates, napthylene diisocyanates, diphenylmethane diisocyanates, toluylene diisocyanates, di or tri-isopropyl benzene diisocyanates, aralkyl diisocyanates, such as the xylylene diisocyanates, fluorine-substituted diisocyanates, ethylene glycol diphenyl ether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3'-diisocyanate, fluorene-2,7-diisocyanate, anthraquinone-2,6-diisocyanate, pyrene-3,8-diisocyanate, chrysene-2,8-diisocyanate, 3'-methoxyhexane-diisocyanate, octane-diisocyanate, w,w'-diisocyanate-1,4-diethylbenzene,w,w'-diisocyanate-1,4-dimethylnaphthalene, cyclohexane-1,3-diisocyanate, 1-isopropylbenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methocybenzene-2,5-diisocyanate, benzeneasonaphthalene-4,4'-diisocyanate, diphenylether-2,4-diisocyanate, diphenylether-4,4'-diisocyanate, and polyisocyanates containing isocyanurate groups.

Of these diisocyanates, 4,4'-diphenymethane diisocyanate and/or the 2,4-and/or the 2,2'-isomers thereof, 1,6-hexamethylene diisocyanate, 2,4-toluylene-and/or 2,5-toluylene diisocyanate and m-xylylene diisocyanate are preferred.

It is also possible to use, for example, the NCO-adducts used in the manufacture of polyurethanes, Such NCO-adducts are relatively high-molecular weight compounds with at least two terminal NCO-groups, which preferably have a molecular weight of 500 to 10,000, in particular of 800 to 2,500. Preferably these NCO-adducts have a content of 1.5 to 5% of NCO-groups. These NCO-adducts may be prepared, for example, be reacting relatively high molecular weight compounds containing OH-groups with an excess of polyisocyanate. The preparation of such NCO-adducts is described, for example, in Angewandte Chemie 64, 523 to 531 (1952), Kunststoffe 42, 303 to 310 (1952), DT-PS No. 831 772, DT-PS No. 897 014, DT-PS No. 929 507 and U.S. Pat. No. 3,000,757. The following may be mentioned, by way of example, as suitable relatively high molecular weight compounds containing OH groups which are suitable for the preparation of the NCO-adducts: polyesters, polyethers, polyesteramides, polythioethers and polyacetals. There may be used as polyols for the preparation of the NCO-adducts, for example, linear hydroxy-polyesters, which contain terminal hydroxy groups and have been obtained either by polycondensation or ε-caprolactone or 6-hydroxycaproic acid or by copolymerisation of ε-caprolactone with dihydric alcohols, or by polycondensation of dicarboxylic acids with dihydric alcohols.

The hydroxyl polyesters used for the preparation of the NCO-adducts can also be prepared from dicarboxylic acids or mixtures of dicarboxylic acids with dihydric alcohols. Suitable dicarboxylic acids are, for example, adipic acid, succinic acid, suberic acid, sebacic acid, oxalic acid, methyl-adipic acid, glutaric acid, pimelic acid, axelaic acid, phthalic acid, terephthalic acid, iso-phthalic acid, maleic acid, fumaric acid, citraconic acid and itaconic acid.

As suitable dihydric alcohols, or mixtures thereof, which are reacted with the dicarboxylic acid or ε-caprolactone to form the desired hydroxylpolyesters, there may be mentioned, for example, ethylene glycol, propylene glycol, butylene glycols, for example, 1,4-butane diol, butene diol, butyne diol, bis-(hydroxymethyl-cyclohexane), diethylene glycol, 2,2-dimethylpropylene glycol and 1,3-propylene glycol.

As the polyols preferably used for the preparation of the NCO-adducts these may be especially mentioned polyesters based on adipic acid, 1,6-hexane diol and neopentylglycol with an average molecular weight of approximately 2000 (e.g., Polyol 2002, made by Polyol-chemie of Osnabruck; hydroxyl number 56; acid number 1), polyesters based on polycaprolactone having an average molecular weight of 2000 (e.g., Niax Polyol D 560 made by Union Carbide Corporation), and polyethers sold under the name "polyol PTMG" of BASF having an average molecular weight of 2000. Furthermore, relatively high molecular weight compounds with terminal carboxyl, amino, and/or mercapto groups are also suitable. Polysiloxanes, which have groups reactive to isocyanates, may also be mentioned. Other compounds which can be used are described, for example, in J. H. Saunders, K. C. Frisch "Polyurethanes" Part 1, New York, 1962, pages 33 to 61 and in the literature cited therein.

Any suitable organic diisocyanate, for example the above-mentioned diisocyanates, can be used for the preparation of the NCO-adducts.

NCO-adducts with terminal isocyanate groups, which have carbon-carbon double bonds, are easily obtainable by using wholly or partially unsaturated polyesters in the manufacture of the NCO-adducts.

Isocyanate compounds which can be used in the purpose of the invention and which have groups which either behave ionically and/or behave as such in the alkaline reaction mixture, and the polymerizable compounds which can likewise be used, as described, for example, in German Offenlegungeschriften Nos. 23 59 606, 23 59 608, 23 59 609, 23 59 612, 23 10 559, 22 27 147 and 17 70 384. Of these the isocyanate compounds which are halogenized, preferably chlorinated, and/or sulphonated are preferred. In some of the above-mentioned Offenlegungsschriften isocyanate compounds which carry non-ionic groups are also mentioned. These compounds are also suitable for the purposes of the invention.

The solids weight ratio of the sodium and/or potassium metallate solution to the isocyanate groups used preferably lies in the range of 0.1 to 6 calculated on the percentage proportion of NCO groups and the dry weight of the metallate solution.

The process of the invention is preferably carried out in the presence of a catalyst. As catalysts there may be especially mentioned, for example, tertiary amines, for example triethylamine, tributyl-amine, N-methyl-morpholine, N-ethyl-morpholine, N-cocomorpholine, N,N,N' N(-tetramethylethylenediamine, 1,4-diaza-bicyclo-(2,2,2)-octane, N-methyl-N'-dimethylaminoethyl-piperazine, N,N-dimethyl-benzylamine, bis-(N,N,-diethylaminoethyl)-adipate, N,N-diethyl-benzylamine, pentamethyldiethylenetramine, N,N-dimethylclcyclo-hexylamine, N,N,N',N'-tetramethyl-1,3-butanediamine, N,N-dimethyl-β-phenylethylamine, 1,2-dimethylimidazole, 2-methylimidazole, and in particular also hexahydrotriazine derivatives. Tertiary amines having hydrogen atoms which are active to isocyanate groups are also suitable as catalysts. There may be mentioned, for example, triethanolamine, triiso-propanolamine, N-methyl-diethanolaminem N-ethyl-diethanolamine, N,N-dimethyl-ethanolamine and the reaction products thereof with alkylene oxides, such as propylene oxide and/or ethylene oxide.

Other suitable catalysts are, for example silaamines having carbon-silicon bonds, such as, for example those described in German Pat. No. 1,229,290, for example 2,2,4-trimethyl-2-silamorpholine and 1,3-diethylaminomethyl-tetramethyl-disiloxane; nitrogen-containing bases such as tetraalkylammoniumhydroxides; alkali metal hydroxides such as sodium hydroxide; alkali metal phenolates such as sodium phenolate; alkali metal alcoholates such as sodium methylate; and hexahydrotriazines.

It is also possible to use as catalysts certain organo-metallic compounds, in particular organo-tin compounds, for example tin(II)- salts of carboxylic acids such as, tin (II)-acetate, tin (II)-octanoate, tin (II)-ethylhexanoate and tin (II)-laurate, and the dialkyltin salts of carboxylic acids such as, for example dibutyl-tin-diacetate, dibutyltin-dilaurate, dibutyl-tin-maleate and dioctyl-tin-diacetate. Other catalysts which can be used in the process of the invention and details of their mode of action are described in the Kunstoff-Handbuch, volume VII, edited by Vieweg and Hochtlen, Carl-Hanser-Verlag, Munich 1966, for example on pages 96 to 102.

The catalysts are generally used in a quantity of between approximately 0.001 and 10% by weight, calculated on the quantity of pseudohalide compounds, e.g., isocyanate.

The catalysts preferably used in the process of the invention are however, those of the general formula

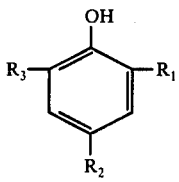

wherein the radicals $R_1$, $R_2$ and $R_3$, which may be the same or different, each represents a hydrogen atom or a radical of the general formula

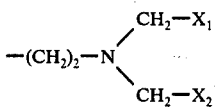

wherein $n$ is an integer of from 1 to 25 and the radicals $X_1$ and $X_2$, which may be the same or different, each represents a hydrogen atom or an alkyl radical having from 1 to 25 carbon atoms, with the proviso that at most two of the radicals $R_1$, $R_2$, and $R_3$ are hydrogen atoms. The alkyl radicals $X_1$ and/or $X_2$ may be substituted by primary and/or secondary hydroxyl groups. Generally compounds with amphoteric ion properties are preferred as catalysts.

It has been found that it is advantageous if the reaction is carried out in the presence of a compound which acts as a hardener and reduces the pH-value of the metallate solution. Examples of suitable compounds of this type are, depending on the metallate used, ammonium chloride, barium chloride, barium nitrate, fuller's earth, disodium phosphate, calcium-magnesium-carbonate, calcium bromide, calcium chloride, calcium iodate, potash alum, potassium fluoride, potassium borofluoride, potassium bromide, potassium carbonate, potassium metabisulphite, potassium silicofluoride, magnesium carbonate, magnesium fluoride, magnesium oxide, magnesium phosphate, monoammonium phosphate, monosodium phosphate, sodium antimonate, sodium acetate, sodium bichromate, sodium bifluoride, sodium bisulphate, sodium bromide, sodium fluoride, sodium hexametaphosphate, sodium metabisulphite, sodium silicofluoride, sodium sulphite, tetrapotassium pyrophosphate, zinc acetate, zinc carbonate and boric acid.

In order to produce foamed materials by the process of the invention a blowing agent may be added to the reaction mixture. As blowing agents there are preferably used inert liquids which boil between $-25°$ and $+50°$ C, preferably between $-15°$ and $+40°$ C. There may be especially mentioned, for example, alkanes, alkenes, halogen-substituted alkanes and alkenes and dialkylethers; for example, saturated or unsaturated hydrocarbons with 4 to 5 carbon atoms, such as isobutylene, butadiene, isoprene, butane, pentane, petroleum ether, halogenated saturated or unsaturated hydrocarbons, such as chloromethane, methylene chloride, fluorotrichloromethane, difluorodichloromethane, trifluorochloromethane, chloroethane, vinyl chloride and vinylidene chloride. Trichlorofluoromethane, vinyl chloride, and $C_4$-hydrocarbons, such as, for example, butane, have proved to be most suitable.

The blowing agent is preferably added in a quantity of up to 50%, preferably 2-30% by weight, calculated on the reaction mixture.

For the production of foamed material at an elevated temperature it is obviously possible to use blowing agents which boil at higher temperatures, for example, hexane, dichloroethane, trichloroethane, carbon tetrachloride and light gasoline. It is possible, however, for the water contained in the reaction mixture to act as a blowing agent. Furthermore, fine metal powders, for example powdered calcium, magnesium, aluminum or zinc, may act as blowing agents by hydrogen development with adequately alkaline water glass, and they simultaneously impart a hardening and strengthening effect to the product.

In order to form a particularly fine cell structure, it is preferred to add nucleus-forming and cell-regulating substances to the reaction mixture. Many compounds are suitable as nucleus-forming substances, for example finely comminuted inert solids, such as silicon dioxide or aluminium dioxide, optionally together with zinc stearate, amorphous silicic acid or metal silicates. Of these, silicon dioxide precipitated from celloidal solution is preferred.

Among the suitable cell-regulating substances are silicone oils based on polysiloxanes, for example DC-193, DC-194, DC-195, L-532 and L-5340 of Union Carbide, SF 1066 and SF 1109 of General Electric, the DC oils of Wacker, Tegiloxan of Goldschmidt and Eumulgin 286 of Henkel. Of these DC-195, L-5340 and Eumulgin 286 are preferred.

There are preferably also used in the production of foamed products surface-active additives, which facilitate the foaming process on account of a reduction in the surface tension of the system. Furthermore they impart to the organo-metallate foams particularly desirable properties as a result of an additional influence on the cell structure. Suitable are, for example, tensides (e.g., those commercially available under the name Eumulgin 286 and manufactured by Henkel) and the non-ionic alkylphenol ethoxylates having a degree of ethoxylation of approximately 6 to 20. Eumulgin 286 and alkylphenolethyoxlate having an ethoxylation degree of 9 to 10 are preferably used.

The surface-active additives can also act simultaneously as foam stabilizers. It is also possible to use, as foam stabilizers, silicon oils (e.g., those commercially available under the name Si L 5340 manufactured by Union Carbide Corporation and Eumulgin 286 of Henkel).

The organo-metallate foams of the invention preferably have a density of between 15 and 750 kg/m$^3$.

Furthermore, to decrease the inflammability of the products of the invention, flame-retarding substances may be added to the sysem, preferably to the metallate solution. These substances can be either dissolved or dispersed in the metallate solution. An example of a flame-retarding substance that is soluble in metallate solutions is trisodium phosphate. 12 H$_2$O. Among the additives not soluble in solutions which, furthermore, simultaneously have strengthening effects, are for example, kieselguhr (diatomaceous earth), aluminum hydrate, magnesium silicate, asbestos powder, chalk, asbestos fibres and glass fibres.

In principle, the organo-metallate-polymers of the invention can be filled with substantial amounts of fillers without losing their high quality; particularly preferred fillers which have a pronounced strengthening action, are water absorbent (hydraulic) additives of organic or inorganic nature, in particular hydraulic cements, synthetic anhydrite gypsum and quicklime.

If using adequate quantities of such water-absorbent additives, there can also be used for the xerosel formation aqueous solutions which have a high water content, for example of 60 - 90%.

There is especially used, as hydraulic cement, Portland cement, quick-setting cement, blast furnace cement, low baken cement, sulphate-resistant cement, masonry cement, natural cement, lime cement, gypsum cement, posssuolana cement or calcium sulphate cement.

The water-absorbent additives are used for the preparation of hard materials preferably in a quantity which is sufficient to absorb 40 to 100% of the water used in the reaction. Advantageously, the quantity of water-absorbent additive is from 50 to 400% by weight of the quantity of the two main components of the reaction mixture.

Fillers and inert additives may, before they are added to the reaction mixture, be steeped, impregnated or sprayed with one of the liquid components used in the reaction, for example to improve their adhesion or flow properties. The absorption of the water by hydraulic binders, in particular cement, lime or anhydrite, is of particular importance with respect to the behaviour of the material in the case of combustion because, on the application of heat the water is slowly liberated endothermically which results in a strong combustion-retarding effect. The quantity of additives added depends primarily on the desired viscosity of the mixture and is preferably between 0.1 and 20% by weight calculated on the weight of the metallate solution. Apart from flame retarding additives or fillers it is for example, possible to add pigments or dyes to the reactiom mixture if colored products are desired.

Further examples of surface-active additives, foam stabilizers, as well as cell regulators, reaction retarders, stabilizers, flame-retarding substances, plasticizers, dyes, fillers and fungistatically and bacteriostatically effective substances, together with details concerning their methods of use and of action, are described in Kunststoff-Handbuch, Vol. VI, edited by Vieweg and Hochtlen, Carl Hanser-Verlag (Publishers) Munich, 1966, for example on pages 103 to 113.

Depending on the desired properties of the organo-metallate polymers, there may in addition be used as reaction components polyhydroxy polyesters and/or polyhydroxy polyethers, for example those used in the manufacture of polyurethanes, and which have already been described above to some extent in connection with the preparation of the NCO adducts which can be used in the process of the invention.

It is furthermore also possible to introduce into the reaction mixture small plastics particles, preferably in the form of an aqueous plastics dispersion.

The mixing of the above-mentioned components may be effected by methods used for the manufacture of polyurethanes. For example, first of all one component and a second component are produced, which are then mixed together after adding appropriate additives and catalysts. Using such a method, in the case of foams, the delay in starting of the reaction is generally between 5 and more than 100 seconds, and can be regulated as desired. Optionally the components can be heated to shorten the starting time.

For particular intended use it can be of advantage to subject the organo-metallate polymers obtained by the process of the invention to a tempering treatment at temperatures above 100° C, in particular from 130° to 250° C.

The following Examples illustrate the invention.

EXAMPLES 1 TO 13

In the following Table, 13 Examples of the practical application of the invention are summarized.

As is usual in polyurethane chemistry, so-called "A" and "B" components are first prepared. In the Examples the A component comprises an aqueous metallate solution, a nucleating agent and a catalyst. The B component comprises an isocyanate, a foam stabilizer, a blowing agent and optionally a phosphate ester as well as a finely dispersed organic salt.

The A and B components are mixed, in the specified parts by weight, with stirring. The exothermic heat reaction liberated during stirring causes the blowing agent to expand the foam.

The numerical data in the Table are, unless otherwise stated, parts by weight.

In the Table the following substances have the following characteristics and/or origin.

1. Celatom MW-31 (Nucleating agent) of the firm of Chemag is an extremely fine, chemically neutral kieselguhr. It is a calcined kieselguhr which is distinguished by an extraordinarily high degree of whiteness combined with a uniform particle distribution and also a good adsorptive power.

2. DMP-30 is the zwitterion catalyst 2, 4, 6-tris (dimethylamino)-methyl -phenol.

3. The catalyst Dabco 33 LV is a product of the firm of Houdry and consists of a 33% solution of triethylene diamine.

4. The polyisocyanate is a commercial product which accumulates as a residue in the production of diphenylmethane diisocyanate.

5. The phosphonate ester is a product which can be mixed with the isocyanate without any reaction occurring owing to the absence of active hydrogen.

It has the following structural formula:

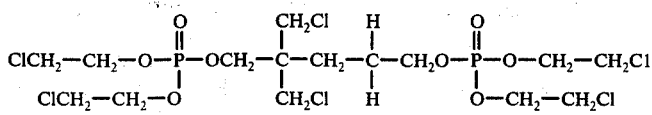

6. The foam stabilizer Silicon oil 193 is a product of the firm of Dow Corning.

7. Sylodex 24 is a thixotropy-inducing agent of the firm of Grace.

8. R 11 is a trichlorofluoromethane blowing agent (boiling point 23.7° C) often used in polyurethane chemistry.

9. The superscripts a, b, c and d have the following meaning:
   (a) saturated aqueous solution,
   (b) 50% aqueous solution,
   (c) 66.6% aqueous solution,
   (d) 33.33% aqueous solution.

| Example substance | 1 | 2 | 3 | 4 | 5 | 6 | 7 |
|---|---|---|---|---|---|---|---|
| Component A | A | | | | | | |
| Sodium molybdenate | 50.85 | | | | | | |
| Potassium permanganate | | 76.65$^a$ | | | | | |
| Sodium stannate | | | 55.56 | 92.20$^b$ | | | |
| Potassium chromate | | | | | 50.85 | 81.66$^a$ | |
| Sodium tungstate | | | | | | | 50.42 |
| Sodium dichromate | | | | | | | |
| Sodium antimonate | | | | | | | |
| H$_2$O | 33.90 | | 37.04 | | 33.90 | | 33.61 |
| Celatom MW 31 | 11.86 | 23.00 | 3.70 | 7.38 | 11.86 | 17.97 | 12.61 |
| DMP 30 | 3.39 | | 3.70 | | 3.39 | | 3.36 |
| Dabco 33 LV | | 0.35 | | 0.42 | | 0.37 | |
| Component B | | | | | | | |
| Polyisocyanate | 95.5 | 26.27 | 95.5 | 26.27 | 95.5 | 26.27 | 95.5 |
| Phosphonate ester | | 23.20 | | 23.30 | | 23.20 | |
| Silicon oil 193 | 0.5 | 0.65 | 0.5 | 0.65 | 0.5 | 0.65 | 0.5 |
| Sylodex 24 | | 0.50 | | 0.50 | | 0.50 | |
| Sodium fluoro-silicate | | 31.53 | | 31.53 | | 31.53 | |
| R 11 | 4 | 17.85 | 4 | 17.85 | 4 | 17.85 | 4 |
| Stirring time Sec. | 20 | | 15 | 15 | | 10 | 10 |
| Observations on the foams obtained | | | | | | | |
| Foam structure | light foam indeterminable | finely porous 290 28 | | finely porous 108 19 | | finely porous 86 23 | |
| kg/m$^3$ | | | | | | | |
| Colour | yellowish | yellowish | light grey | yellowish | light greenish yellow | | yellowish |

| Example No. | 8 | 9 | 10 | 11 | 12 | 13 |
|---|---|---|---|---|---|---|
| Substance used | | | | | | |
| Component A | | | | | | |
| Sodium molybdenate | | | | | | |
| Potassium permanganate | | | | | | |
| Sodium stannate | | | | | | |
| Potassium chromate | | | | | | |
| Sodium tungstate | | | | | | |
| Sodium dichromate | 83.02$^c$ | | | | 83.02 | |
| Sodium antimonate | | | 53.57 | 83.02$^d$ | | |
| H$_2$O | | | 33.90 | 35.71 | | |
| Celatom MW 31 | 16.60 | 11.86 | 7.14 | 16.60 | 24.16 | 16.60 |
| DMP 30 | | 3.39 | 3.57 | | | 0.38 |
| Dabco 33 LV | 0.38 | | 0.38 | 0.38 | 0.35 | |
| Component B | | | | | | |
| Polyisocyanate | 26.27 | 95.5 | 95.5 | 26.27 | 26.27 | 26.27 |
| Phosphonate ester | 23.20 | | 23.20 | 23.20 | 23.20 | 23.20 |
| Silicon oil 193 | 0.65 | 0.5 | 0.5 | 0.65 | 0.65 | 0.65 |
| Sylodex | 0.50 | | | 0.50 | 0.50 | 0.50 |
| Sodium fluoro-silicate | 31.53 | | | 31.53 | 31.53 | 31.53 |
| R 11 | 17.85 | 4 | 4 | 17.85 | 17.85 | 17.85 |
| Stirring time | 6 sec. | 10 sec. | | 30 sec. | 30 sec. | |
| Observations of the foams obtained | | | | | | |
| Foam structure | | finely porous | finely porous | | | |
| Density | 41 | 20 | 29 | 287 | 625 | 44 |
| Colour | glittering brown | beige | yellowish | light grey green | green | glittering brown |

What we claim is:

1. A method of making an organo-metallate polymer comprising reacting, in liquid phase, a mixture containing:
   A. A pseudohalide compound selected from the group consisting of organic isocyanates and thioisocyanates having at least two isocyanate or thioisocyanate groups, and organic thiocyanates and selenocyanates having at least two thiocyanate or selenocyanate groups
   B. An aqueous alkaline solution of a metallate comprising a soluble salt of a compound having the formula $$H_n(MeX_m)$$

in which X is oxygen or sulfur, Me is a metal capable of forming an anion with X, and $n$ and $m$ are whole numbers, whereby said metallate; on a dry basis being present in an amount of about at least about 17.5 to about 210.5 parts by weight per 100 parts by weight of pseudohalide compound,
   C. A catalyst for catalyzing a pseudohalide reaction, said catalyst being a tertiary amine of the general formula:

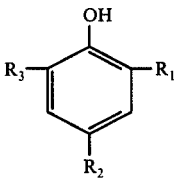

in which formula the radicals $R_1$, $R_2$ and $R_3$, which may be the same or different, each represents a hydrogen atom or a radical of the general formula:

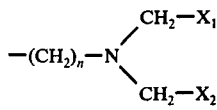

in which n is an integer of from 1 to 25 and the radicals $X_1$ and $X_2$, which may be the same or different, each represents a hydrogen atom or an alkyl radical having 1 to 25 carbon atoms and which may be substituted by primary and/or secondary hydroxyl groups, at most two of the radicals $R_1$, $R_2$ and $R_3$ being hydrogen atoms.

2. A method according to claim 2 wherein the catalyst comprises: 2,4,6-tris(dimethylaminomethyl)phenol.

3. A method according to claim 3 wherein said pseudohalide compound is selected from the group consisting of organic isocyanates and thioisocyanates having at least two isocyanate or thioisocyanate groups.

4. A method according to claim 4 wherein said metallate is selected from the group consisting of sodium, potassium ammonium and calcium germanates, stannates, thiostannates, plumbates, aluminates, titanates, vanadates, chromates, manganates, molybdates, tungstates, arsenates, tellurates, bismuthates, zincates, niobates, and tantalates.

5. A method according to claim 1 wherein said metallate is selected from the group consisting of potassium chromate, sodium hydrogen arsenate, sodium tungstate, sodium molybdate, sodium stannate, potassium tellurate, potassium aluminate, and alkaline titanium dioxide.

6. A method according to claim 1 wherein said metallate comprises a crude, unpurified, solution containing impurities.

7. A method according to claim 1 wherein said pseudohalide comprises a mixture of organic isocyanate compounds containing a predominant quality of polyisocyanate compounds having at least three isocyanate groups.

8. A method according to claim 7 wherein said mixture of isocyanates is obtained by phosgening an aniline-formaldehyde resin and separating the resulting higher-functional polyisocyanates from other isocyanates.

9. A method according to claim 7 wherein said mixture contains substantially no diisocyanates or monisocyanates.

10. A method according to claim 1 wherein said pseudohalide comprises an NCO adduct having terminal NCO-groups and a molecular weight of from 500 to 10,000.

11. A method according to claim 10 wherein said NCO adduct has a content of 1.5 to 5% NCO-groups.

12. A method according to claim 11 wherein said NCO adduct has ethylenically unsaturated bonding.

13. A method according to claim 1 wherein the pseudohalide compound comprises an organic isocyanate containing groups or atoms which are either ionic or behave as such in the reaction mixture.

14. A method according to claim 13 wherein the isocyanate contains one or more halogen atoms and/or one or more sulphonate groups.

15. A method according to claim 13, wherein the isocyanate contains one or more chlorine atoms.

16. A process according to claim 1 wherein the reaction is carried out in the presence of a blowing agent.

17. A process according to claim 16 wherein the blowing agent is an inert liquid that boils between $-25$ and $+50°$ C.

18. A process according to claim 17 wherein the blowing agent is an inert liquid that boils between $-15$ and $+40°$ C.

* * * * *